United States Patent [19]

Stephanoff et al.

[11] 4,349,343
[45] Sep. 14, 1982

[54] CHAIN FOR VARIABLE SPEED TRANSMISSION

[75] Inventors: Louis J. Stephanoff, Indianapolis; Stellios A. Avramidis, Mooresville, both of Ind.

[73] Assignee: PT Components, Inc., Indianapolis, Ind.

[21] Appl. No.: 107,757

[22] Filed: Dec. 27, 1979

[51] Int. Cl.³ .......................... F16H 9/12; F16H 9/24
[52] U.S. Cl. .................................................. 474/245
[58] Field of Search ............... 474/206, 213, 215, 217, 474/220, 226, 227, 228, 240, 242, 245, 153, 156, 157, 164, 272, 8, 149, 148; 59/5, 6, 7, 35 R, 84, 91, 92

[56] References Cited

U.S. PATENT DOCUMENTS

| | | | |
|---|---|---|---|
| 515,004 | 2/1894 | Loomis | 474/206 |
| 550,540 | 11/1895 | Simpson | 474/206 X |
| 1,151,587 | 8/1915 | Hess | 474/149 X |
| 1,485,520 | 3/1924 | Nichols | 59/91 |
| 2,073,846 | 3/1937 | Maurer | 474/243 |
| 2,550,431 | 4/1951 | Shaw | 474/242 X |
| 2,913,916 | 11/1959 | Schmidt | 474/8 |
| 3,016,755 | 1/1962 | Dittrich | 474/8 |
| 3,153,348 | 10/1964 | Kuntzmann | 474/213 X |
| 3,407,672 | 10/1968 | Keller | 474/242 |
| 3,431,724 | 3/1969 | Steves | 59/35 |
| 3,661,025 | 5/1972 | Avramidis | 474/217 |
| 3,688,595 | 9/1972 | Bauer | 474/8 |
| 3,742,776 | 7/1973 | Avramidis | 474/215 |
| 4,046,023 | 9/1977 | Henle et al. | |
| 4,058,021 | 11/1977 | Wood | 474/213 X |

FOREIGN PATENT DOCUMENTS

| | | | |
|---|---|---|---|
| 26602 | 12/1963 | Fed. Rep. of Germany . | |
| 2607545 | 9/1977 | Fed. Rep. of Germany | 474/206 |
| 49580 | 1/1919 | Sweden | 474/245 |
| 26865 | of 1907 | United Kingdom | 474/206 |

*Primary Examiner*—Allan D. Herrmann
*Attorney, Agent, or Firm*—Robert A. Brown

[57] ABSTRACT

A drive chain for a variable speed transmission has two groups of links pivotally connected together by pivot pins lying on a pitch line. Drive pins are loosely received in each group of links, on a drive line spaced from the pitch line, for engagement with pulleys of a variable speed transmission.

6 Claims, 11 Drawing Figures

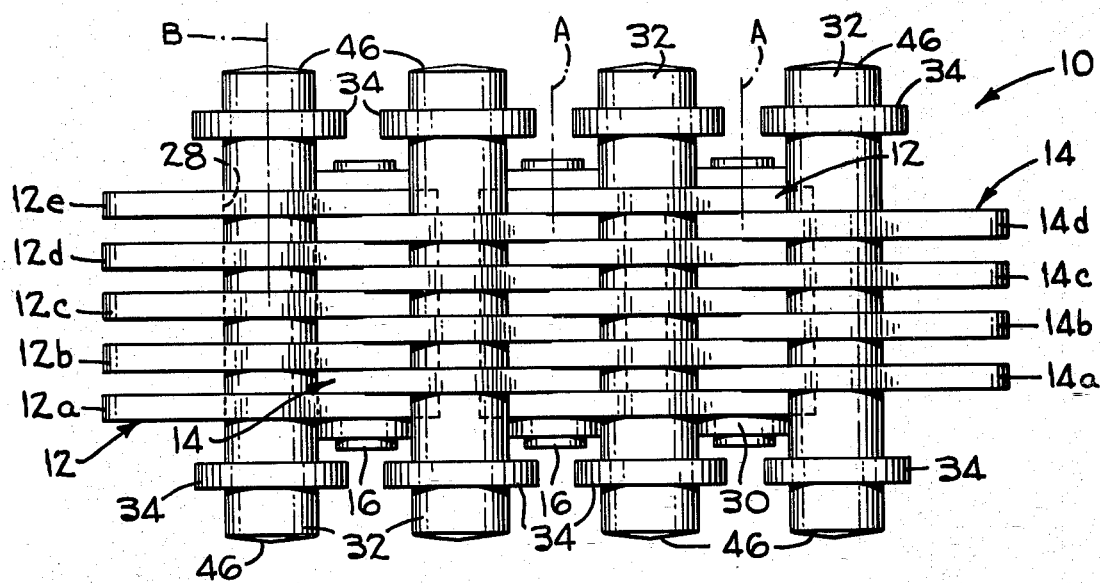
FIG_1
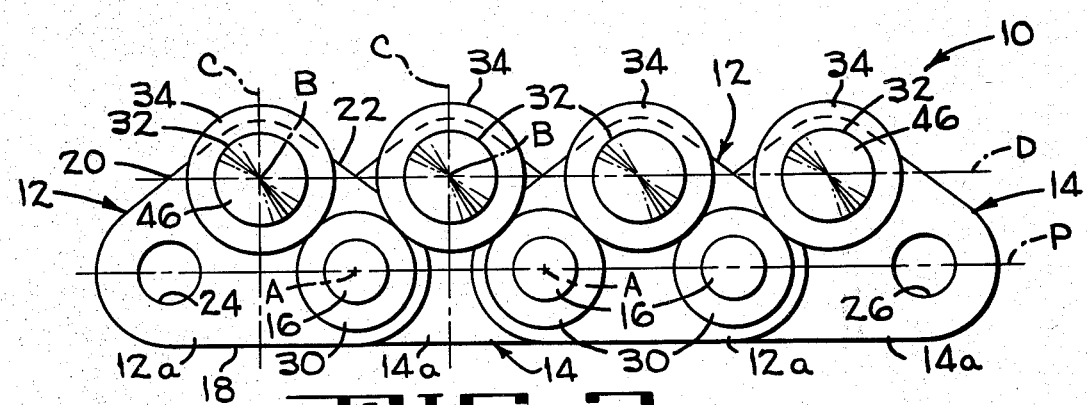
FIG_2
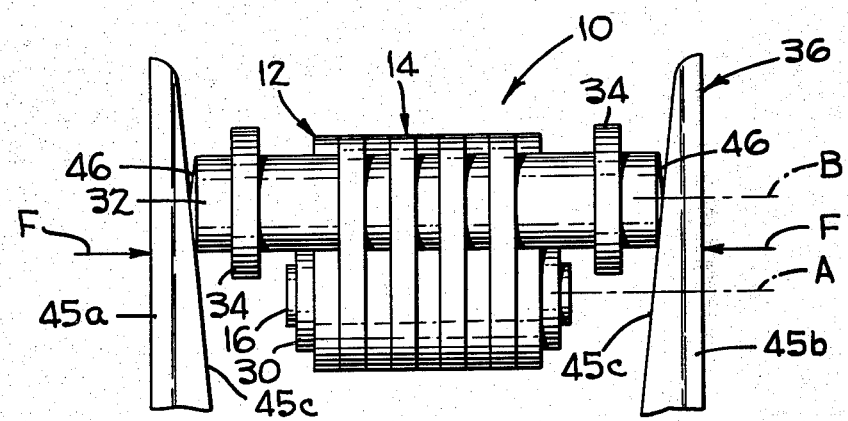
FIG_3

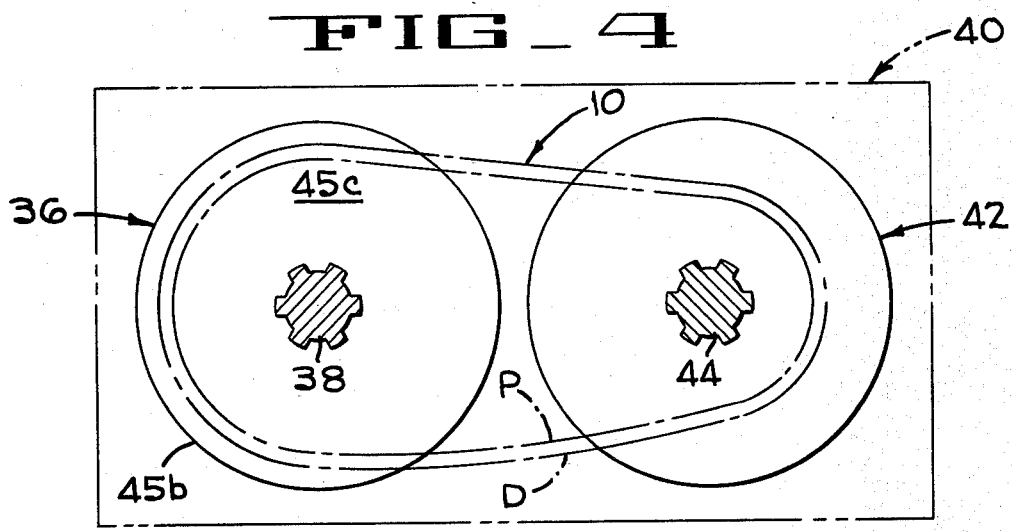
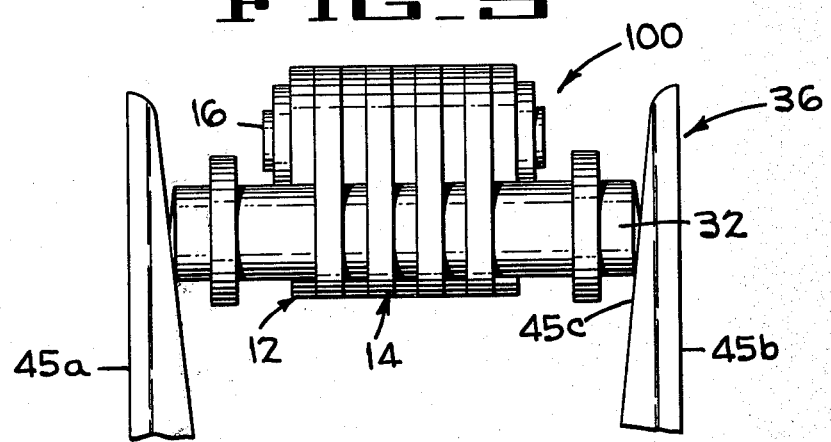
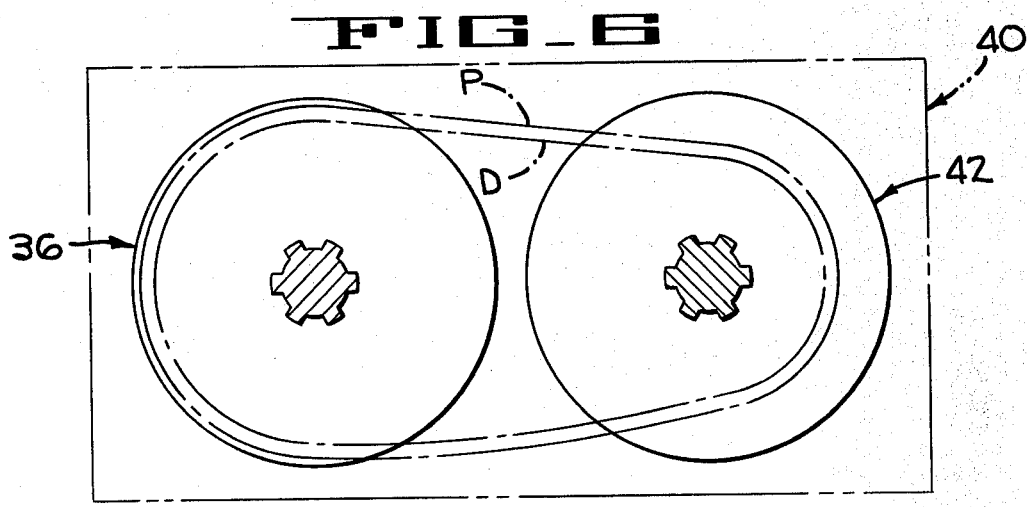

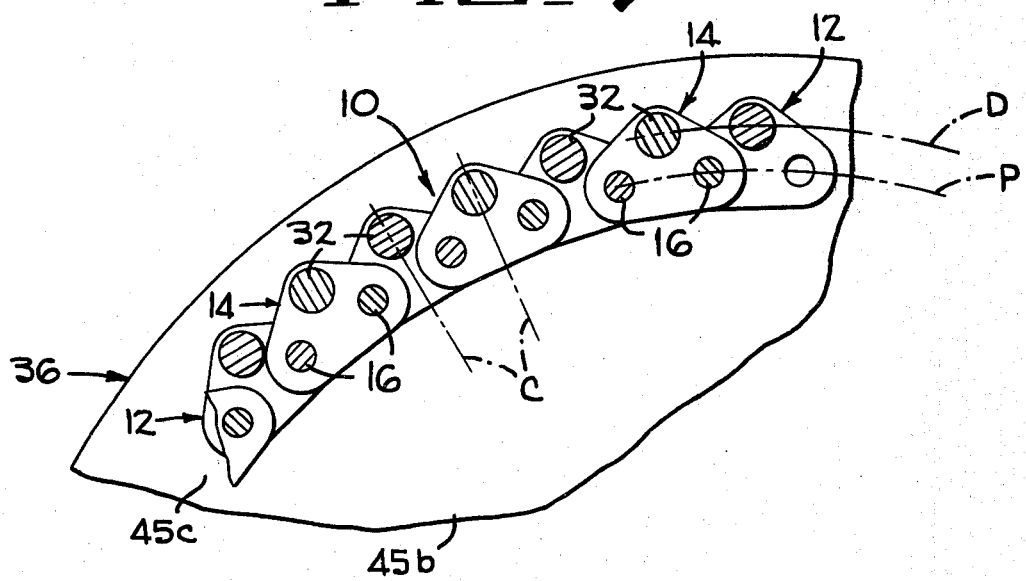
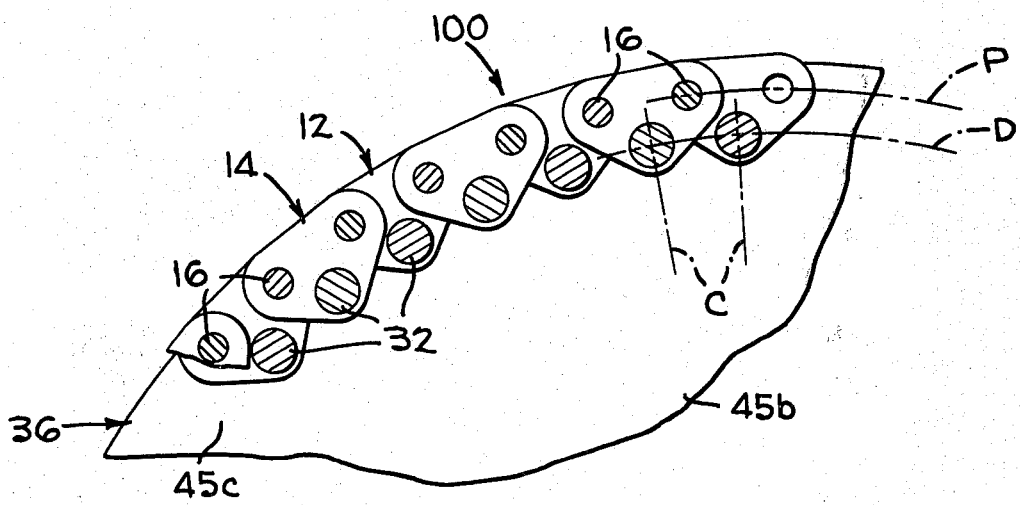

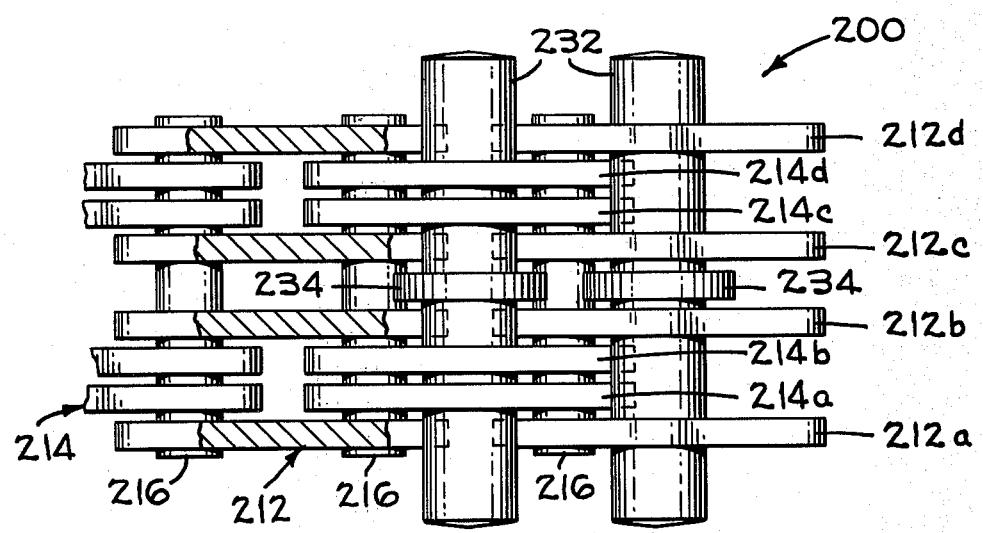
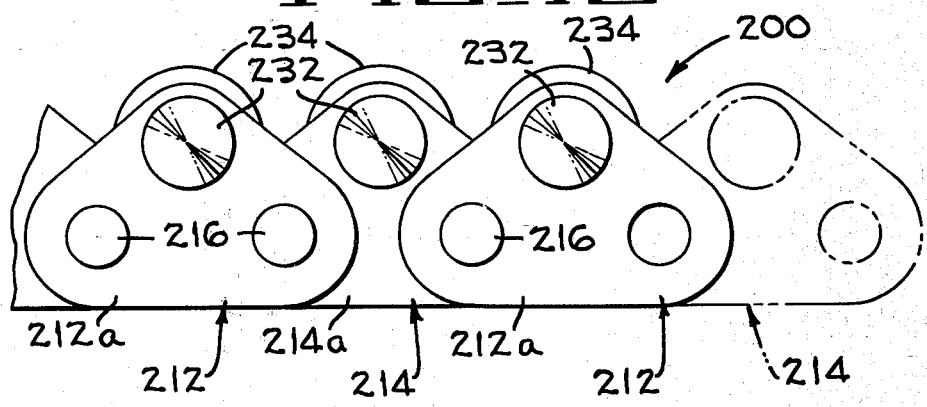
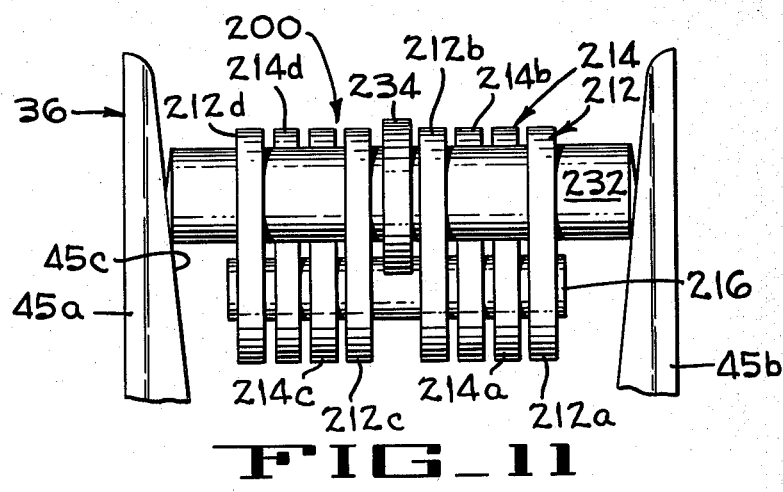

CHAIN FOR VARIABLE SPEED TRANSMISSION

BACKGROUND OF THE INVENTION

1. Field of the Invention

The present invention relates to a drive chain for a variable speed transmission.

2. Description of the Prior Art

In a variable speed transmission of the type shown, for example, in U.S. Pat. No. 4,046,023, a pulley is securely mounted on each of two parallel shafts. Each pulley has two conical faces to receive therebetween an endless drive chain which, through the pulleys, connects the two shafts in driving relation. The spacing between the two conical faces of each pulley can be varied to alter the drive ratio between the two shafts.

Although there are many different types of drive chains, one of the most practical and effective is the type shown in U.S. Pat. No. 2,550,431 of L. E. Shaw. This drive chain is made up of rigid links comprising, alternately, outer links and inner links pivotally connected together by pivot pins to define an endless chain. The ends of the pivot pins extend beyond the outer links for driving engagement with the smooth conical faces of the two pulleys mounted on the respective shafts of the transmission.

SUMMARY OF THE INVENTION

In accordance with the present invention, there is provided a drive chain for variable speed transmission having two spaced apart pulleys with conical faces to receive the drive chain, said chain having a plurality of links pivotally connected in end to end relation at pivot joints lying on a pitch line, the improvement comprising a drive pin mounted in at least some of said links having end faces for engagement with the walls of the pulleys, said drive pin extending through said links on an axis spaced from said pitch line to provide a force moment resisting relative twisting between the links at the pivot joints.

BRIEF DESCRIPTION OF THE DRAWINGS

FIG. 1 is a plan view of the drive chain of the present invention.

FIG. 2 is a side view of the chain of FIG. 1.

FIG. 3 is an end view of the chain of FIG. 1, shown in driving engagement with the smooth conical walls of one of the pulleys of a transmission.

FIG. 4 is a central section taken between the walls of the transmission pulleys showing the pitch line and the drive line of the chain of FIGS. 1 to 3.

FIG. 5 is a view, taken as the view of FIG. 3, of another embodiment of a drive chain constructed in accordance with the present invention.

FIG. 6 is a view, taken as the view of FIG. 4, showing the pitch line and the drive line of the chain of FIG. 5.

FIG. 7 is a fragmentary section of a portion of the chain of FIGS. 1 to 4, taken on a plane between the end retaining washers and showing adjacent groups of links in driving engagement with a pulley.

FIG. 8 is a fragmentary section of a portion of the chain of FIGS. 5 and 6, taken on a plane between the end retaining washers and showing adjacent groups of links in driving engagement with a pulley.

FIG. 9 is a plan view of yet another embodiment of a drive chain constructed in accordance with the present invention.

FIG. 10 is a side view of the drive chain of FIG. 9.

FIG. 11 is an end view of the drive chain of FIG. 9, shown in driving engagement with the smooth conical walls of one of the pulleys of a transmission.

DESCRIPTION OF THE PREFERRED EMBODIMENTS

There is shown in FIG. 1 a plan view of one embodiment of the drive chain 10 of the present invention. The chain 10 has alternate groups 12 and 14 of links pivotally connected together by pivot pins 16. Each group 12 consists of identical links 12a, 12b, 12c, 12d and 12e; and each group 14 consists of links 14a, 14b, 14c, and 14d, identical to each other and to the links of group 12. The links of group 12 are interdigitated at each end with the links of the adjacent groups 14; and the links of group 14 are interdigitated at each end with the links of the adjacent groups 12.

Each link of both groups is of generally triangular configuration, with rounded corners. For illustrative purposes, the generally triangular shape of the links is isosceles in form, with a base 18 and equal sides 20, 22. Openings 24 are provided at one base corner of the links, openings 26, of equal size to openings 24, are provided at the other base corner of the links, and a substantially larger opening 28 is provided at the apex of the triangular links.

A pivot pin 16 is received in the openings 26 of one group 12 of links, and also through the openings 24 of the adjacent group 14 of links. Another pivot pin 16 is received in the openings 26 of the latter group 14 of links and also through the openings 24 of the next adjacent group 12 of links. The pins 16 are loosely received in the openings 24 and 26 of the groups 12 and 14, and are held in the openings by retaining washers 30 secured to the respective ends of the pins. Thus, the groups 12 and 14 of links are pivotally connected together, in alternating sequence, by the pivot pins 16 which have central longitudinal axes A defining pivot axes. The pivotal connection of the adjacent groups of links to the pivot pins define pivot joints. Although the pivot joints described above are preferred, the adjacent groups 12 and 14 of links can be pivotally connected together by other pivot joints, such as those shown in U.S. Pat. Nos. 3,742,776 or 3,661,025. The transmission drive chain 10 is endless, as indicated in FIG. 4.

A line P connecting the central longitudinal axes A of the pivot pins 16, as viewed in FIG. 2, constitutes a pitch line through the pins. The line P takes the form of a loop (FIG. 4) in the endless drive chain illustrated.

A drive pin 32, having a central longitudinal axes B, is loosely received in the openings 28 of each group 12 and 14 of links of the drive chain. Each pin 32 is retained in a group of links by retaining washers, or members, 34 secured to opposite ends of the pin. The axis B of the drive pin extending through each link lies on an axis C which is perpendicular to, and bisects into two equal parts, that segment of pitch line P which extends between the two pivot pins 16 passing through each link, as shown in FIG. 2. The axes B also lie on a drive line D which, for the illustrated endless loop drive chain, takes the form of a loop, as shown in FIG. 4. The drive pin 32 could, alternatively, be loosely received in bushings which are pressed into openings 28.

The drive chain 10 is received in a pulley 36 mounted on an input shaft 38 of a transmission (indicated schematically at 40), and in a like pulley 42 mounted on an output shaft 44 of the transmission. As shown in FIG. 3, each pulley has opposing walls 45a, 45b, each with smooth conical inner faces 45c which are engaged by a portion of the conical end faces 46 of the drive pins 32. The pulley walls are biased by forces F toward each other (by mechanism in the transmission, not shown), to maintain the chain taut in a known manner, such as disclosed in U.S. Pat. No. 4,046,023.

In the chain 10 of the embodiment of the invention in FIGS. 1 to 4, inclusive, the drive loop D falls outside the pitch loop P, as shown in FIG. 4. In the chain 100 of the embodiment of the invention shown in FIGS. 5 and 6, the drive loop D falls inside the pitch loop P, as shown in FIG. 6.

Adjacent groups of links 12 and 14 of the chain 10 are shown, in FIG. 7, with the drive pins 32 engaged with the walls of one of the pulleys on which the chain is received. It will be noted that the axes C of the adjacent groups are not parallel and converge as they extend radially inwardly. Since the pivot pins 16 are spaced radially inwardly from the drive pins 32, the drive pins are spaced a greater distance apart on the drive loop D than are the pivot pins on the pitch loop P.

Adjacent groups 12 and 14 of links (which may be identical to groups 12 and 14 of chain 10) of chain 100 are shown, in FIG. 8, with the drive pin 32 engaged with the walls of one of the pulleys on which the chain is received. In chain 100, the axes C of the adjacent groups 12 and 14 also converge as they extend inwardly, and since the pivot pins 16 are, in this embodiment, spaced radially outwardly from the drive pins 32, the drive pins are spaced apart a smaller distance than the pivot pins. Thus, assuming the links 12 and 14, and the pins 32, of chains 10 and 100 are of equal length, and the drive pins 32 of chain 100 engage the walls of the pulleys at the same distance from the center of the pulleys as the drive pins of chain 10, the chain 10 of FIG. 7 must be shorter than the chain 100 of FIG. 8. It will be noted, however, that under these circumstances, more drive pins of chain 100 will be engaged with the pulleys than drive pins of chain 10. Although the additional drive pin engagement of chain 100 is advantageous, it is our opinion that the arrangement of chain 10 undergoes less twisting during operation and is, therefore, the preferable embodiment.

In other respects, the chain 100 of FIGS. 5 and 6 is identical to the chain 10 of FIGS. 1 to 4. In fact, the chain of either embodiment can be turned upside down and used as the chain of the other embodiment (with a modification in length if the drive pins are to engage the pulleys at the same distance from the center of the pulleys). In both embodiments of the invention, the drive loop D is spaced from the pitch loop P.

Yet another embodiment of the invention is shown in FIGS. 9, 10 and 11. The chain 200 of FIG. 9 has two different groups of links, groups 212 and groups 214, pivotally connected alternately in an endless loop. The links of both groups are identical to the links of groups 12 and 14 previously described. Each link of each group receives a pivot pin 216 at its base corners, and each receives a drive pin 232 at its apex. The links of group 212 (212a, 212b, 212c, 212d) are tightly received on pivot pins 216 in spaced apart relationship. One pair (212a, 212b) of links of group 212 on one end of pivot pin 216 receives therebetween two links (214a, 214b) of group 214, which are loosely mounted on pivot pin 216. The other pair (212c, 212d) of links of group 212 on the other end of pivot pin 216 receives therebetween two other links 214c, 214d of group 214 which are also loosely mounted on pivot pin 216. Drive pins 232 are loosely received in the links of both groups for axial and rotational movement therein. A retaining washer, or member, 234 is tightly secured to the center of the drive pins, between the links 212b and 212c. These washers thereby limit the axial movement of the pins 232 received in both the links of group 212 and the links of group 214 by engagement of the washers with the links 212b or links 212c.

In a typical prior art drive chain (as shown, for example, in the United States patent to Shaw U.S. Pat. No. 2,550,431), driving engagement with the pulley is made on the pitch line by the pivot pins of the drive chain. In the prior art arrangement, and in any arrangement where the driving pins are located on the pitch line, the size of the driving pins is limited. Since two or more pivot pins of each link must be located on the pitch line, the driving pins cannot be as large as a single drive pin, such as drive pin 32, located in a position on the link spaced from the pitch line. In the three embodiments disclosed herein, the diameter of the drive pin is substantially greater than the diameter of the pivot pins (almost 50% greater in the illustrated embodiments). For a given chain pitch size, with the larger drive pins, greater axial force can be applied to pin ends by the pulley walls without exceeding surface contact stress limits (Hertz stress limit), permitting the transmission of greater power.

Another advantage in the drive pin arrangement of the present invention, accruing from the spacing between the drive pins and the pitch loop, is the added stability of the chain. With the drive pins on the pitch line, twisting of the chain about that line (which occurs in small increments at each pivot joint) can occur during operation. As the incremental twist between adjacent groups of links accumulates during operation, the drive pins can become cocked between the pulleys for poor engagement with the pulley walls and loss of power.

With the improved drive pin arrangement disclosed, the drive pins are spaced above or below the pivot pins. The pivot pins are the potential source of the accumulated twist, and, by virtue of this spacing, the drive pins serve to hold the chain against twisting in a way that no drive pin or pins on the pitch line could. Thus, if the chain is initially installed without twist, twist is less likely to start in the chain of the present invention than with a chain having drive pins on the pitch line. Although the links can shift laterally on the drive pins, because of the spacing between the links and washers 34 (or 234), the drive pins reduce the tendency for twist between the groups 12 and 14 (or groups 212, 214) of links at the pivot joints defined by the pins 16.

Although each group of links in the drive chain of the present invention may have as few as two links in side by side relationship, we prefer to use more links, as shown in the embodiments of FIG. 1, FIG. 5 and FIG. 9.

Although the best mode contemplated for carrying out the present invention has been herein shown and described, it will be apparent that modification and variation may be made without departing from what is regarded to be the subject matter of the invention.

What is claimed is:

1. In a drive chain for a variable speed transmission having two spaced apart pulleys with conical faces to receive the drive chain, said chain having a plurality of links pivotally connected in end to end relation at pivot joints lying on a pitch line that extends longitudinally of the chain, the improvement comprising a drive pin mounted in at least some of said links and extending transversely of the chain with said drive pin having end faces for engagement with the walls of the pulleys, said drive pin extending laterally through said links and movable on its axis spaced vertically from said pitch line to provide a lateral force moment resisting twisting of the links about the pitch line at the pivot joints when either end face of the drive pin is in contact with an adjacent conical face of a pulley.

2. In a drive chain for a variable speed transmission having two spaced apart pulleys with conical faces to receive the drive chain, said chain having a plurality of groups of links pivotally connected in interdigitated end to end relation by pivot pins at pivot joints lying on a pitch line that extends longitudinally of the chain, the improvement comprising a drive pin with a cross-sectional diameter larger than that of said pivot pins extending lengthwise through each of said groups of links and located on a lateral axis spaced vertically from said pitch line, each drive pin being movable on said lateral axis and having end faces for engagement with the walls of the pulleys to provide a lateral force moment resisting twisting of the links about the pitch line at the pivot joints when either end face of the drive pin is in contact with an adjacent conical face of a pulley.

3. The drive chain of claim 2 wherein said drive chain is endless with said pitch line defining an endless pitch loop, and wherein said drive pins lie in an endless drive loop outside the endless pitch loop.

4. The drive chain of claim 2 wherein said drive chain is endless with said pitch line defining an endless pitch loop, and wherein said drive pins lie in an endless drive loop inside the endless pitch loop.

5. In a drive chain for engagement with conical faced pulleys, said chain having a plurality of links pivotally connected in end to end relation at pivot axes intersecting a pitch line that extends longitudinally of the chain, the improvement comprising drive pins extending laterally through said links parallel to said pivot axes and spaced vertically from said pitch line, said drive pins having end faces for engagement with the conical faces of the pulleys, the drive pins being loosely disposed in the links for axial and rotational movement relative thereto, and stop members secured on the ends of the drive pins is spaced relation to the links to limit the axial movement of the drive pins relative to the links.

6. In a drive chain for engagement with conical faced pulleys, said chain having a plurality of links pivotally connected in end to end relation at pivot axes intersecting a pitch line that extends longitudinally of the chain, the improvement comprising drive pins extending laterally through said links parallel to said pivot axes and spaced vertically from said pitch line, said drive pins having end faces for engagement with the conical faces of the pulleys, the drive pins being loosely disposed in the links for axial and rotational movement relative thereto, and stop members secured on the drive pins between, and in spaced relation to, the links to limit the axial movement of the drive pins relative to the links.

* * * * *